Sept. 18, 1923.
M. T. SEYMOUR
1,468,419
ELECTRIC COFFEE ROASTER
Filed March 28, 1922     4 Sheets-Sheet 3
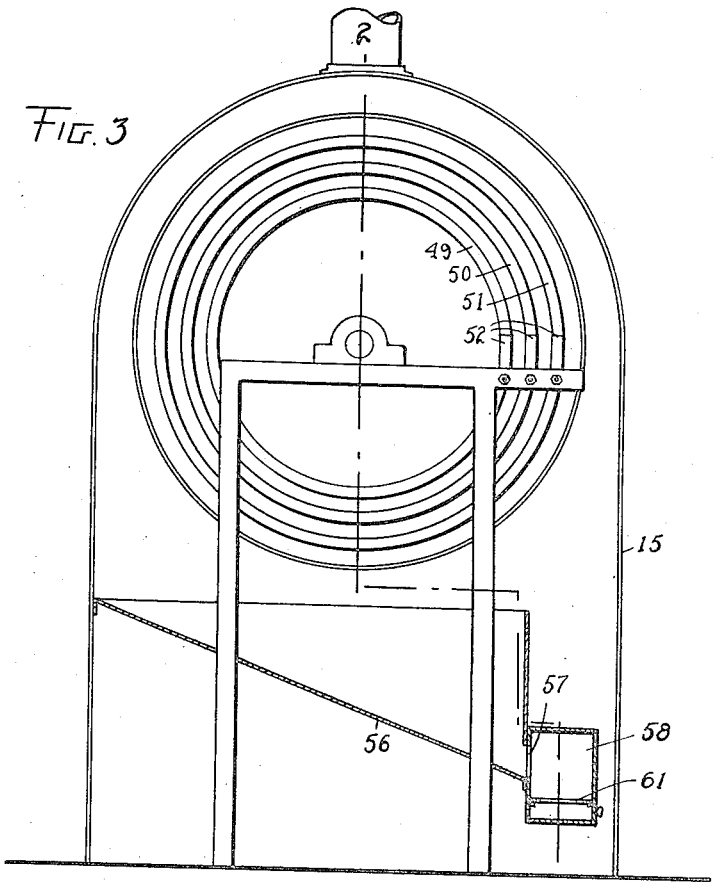
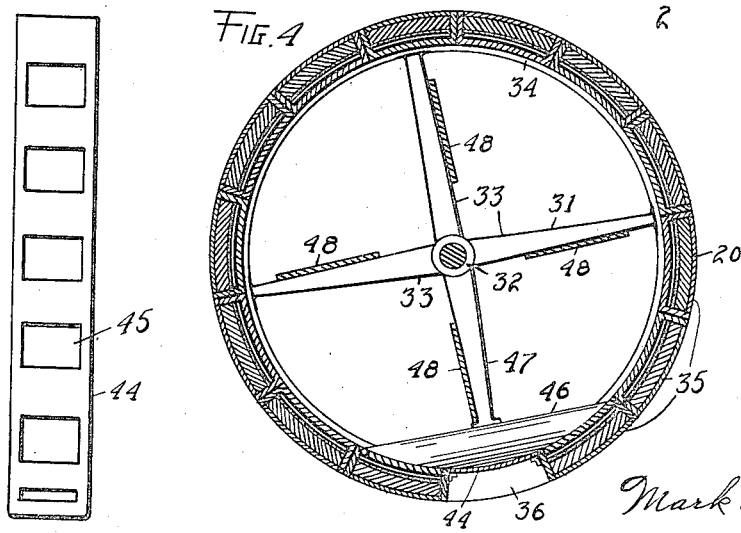

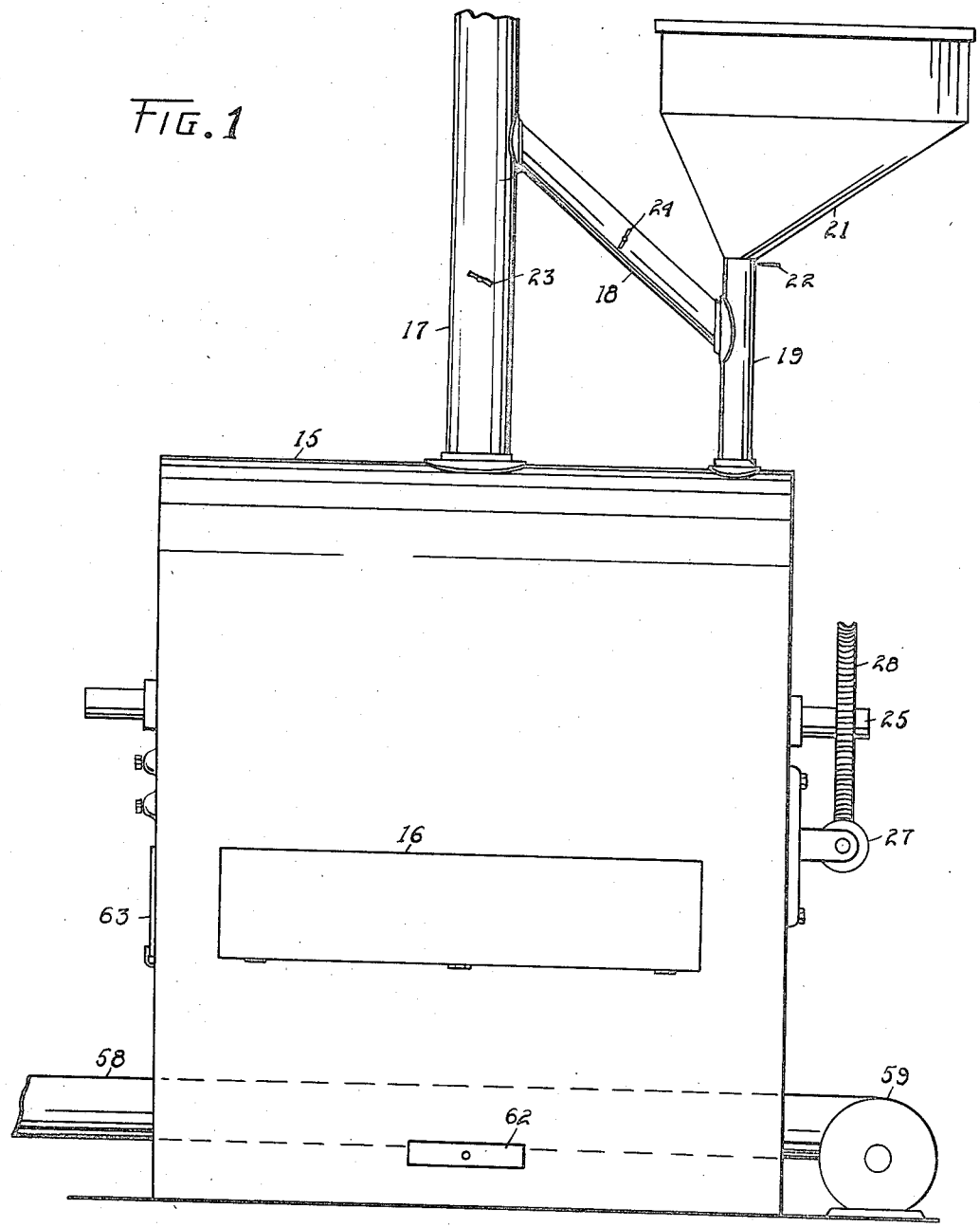

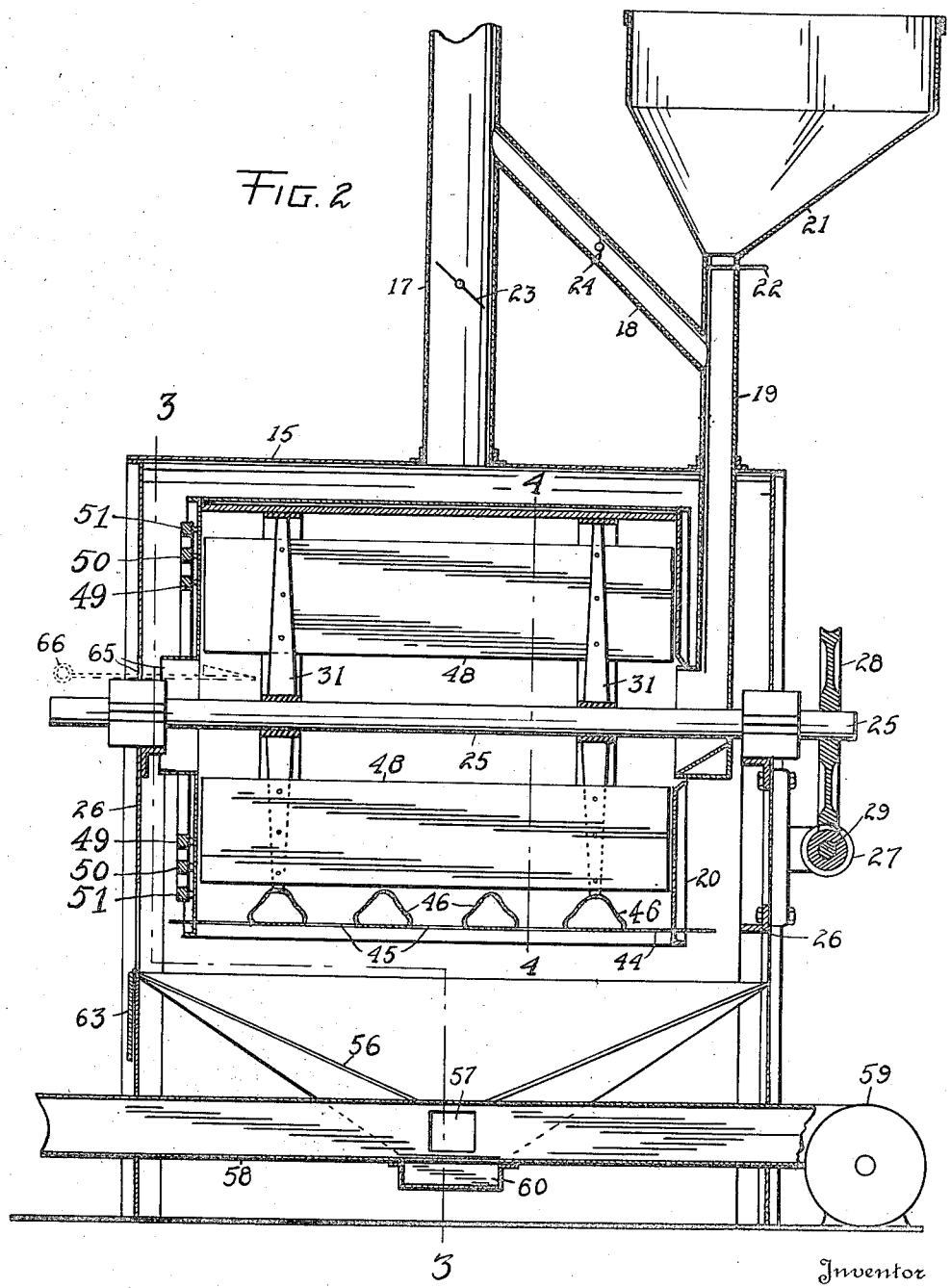

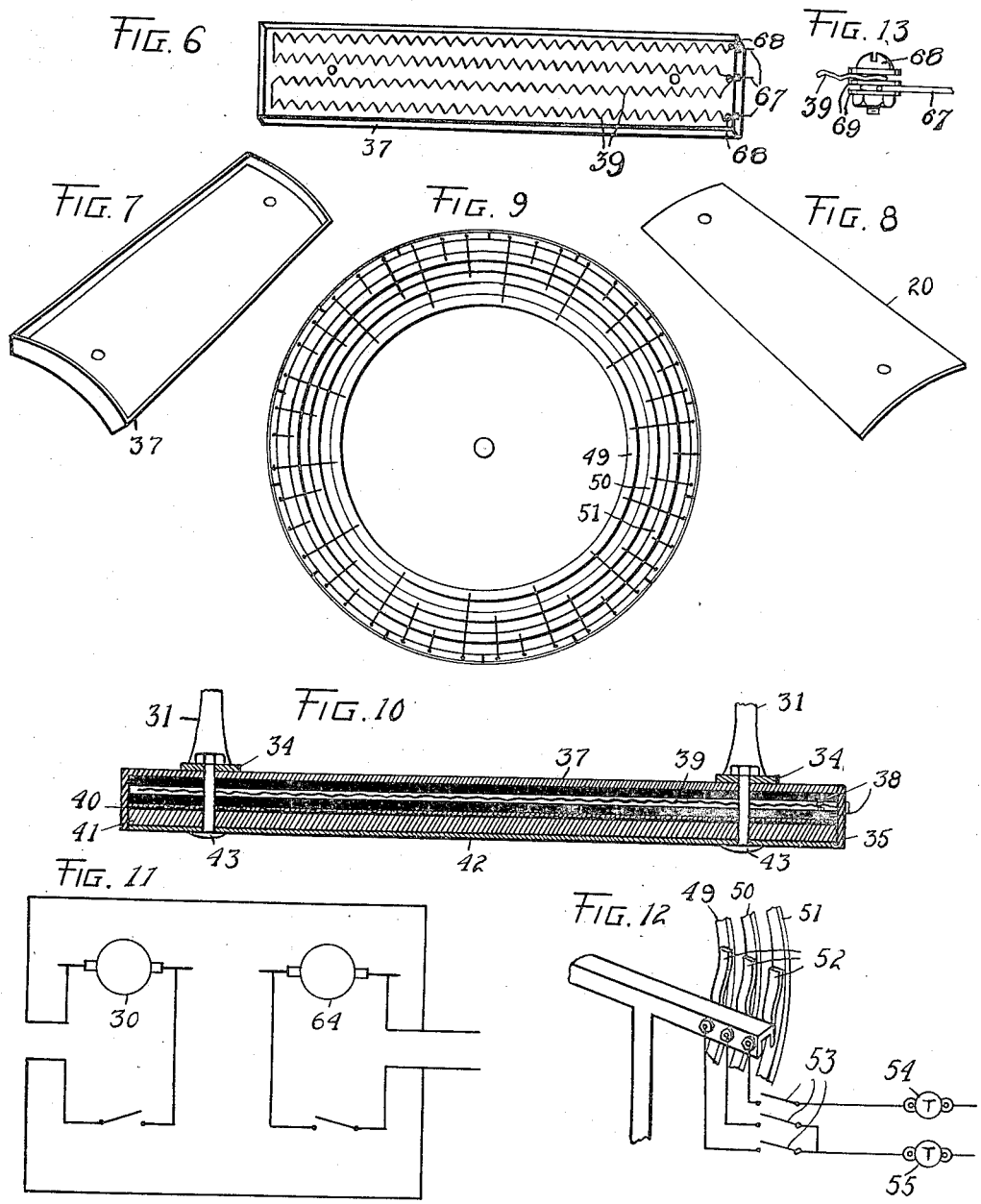

Patented Sept. 18, 1923.

1,468,419

UNITED STATES PATENT OFFICE.

MARK T. SEYMOUR, OF STOWE, NEW YORK.

ELECTRIC COFFEE ROASTER.

Application filed March 28, 1922. Serial No. 547,386.

*To all whom it may concern:*

Be it known that I, MARK T. SEYMOUR, a citizen of the United States, residing at the village of Stowe, in the county of Chautauqua and State of New York, have invented certain new and useful Improvements in Electric Coffee Roasters, of which the following, taken in connection with the accompanying drawings, is a specification.

The invention relates to roasters for coffee and cocoa beans, peanuts and similar articles, for which it is desired to provide a uniform and easily controlled roasting heat. The present invention is an improvement upon the construction shown in my Patent No. 1,334,876, March 23, 1920; and the object of the present improvement is, first, to provide a roasting cylinder composed of a series of similarly constructed heating element trays, any one of which may be quickly and easily removed for repair, or for admission to the interior of the roasting cylinder; second, to provide a slide lengthwise of the cylinder having a plurality of openings with guides thereto, said slide preferably equalling in width one of said heating element trays to draw the roast therethrough; third, to provide an outer casing for the entire roasting mechanism having a damper controlled draft pipe or chimney therefrom and a second damper controlled draft pipe extending to the center of the roasting cylinder to draw the moisture and dust therefrom; fourth, to provide baffle plates to evenly spread the coffee or other articles to be roasted on the hot surface of the heating elements as the roasting cylinder is rotated; and fifth, to provide a hopper to receive the roast and a cold air blast to cool and raise the roast to a bin, electrical connections being shown for operating said mechanism and providing heat for said heating elements; and the invention consists in the novel features and combinations hereinafter set forth and claimed.

In the drawings, Figure 1 is a side elevation of the roaster showing the casing with door, draft pipes, stoner drawer, blast pipe and fan, driving gear and hopper for filling the roasting cylinder. Fig. 2 is a lengthwise sectional view of the roaster at line 2—2 in Fig. 3. Fig. 3 is a sectional view of the roaster at line 3—3 in Fig. 2 showing the hopper and blast pipe, stoner drawer, casing and end elevation of the roasting cylinder and its support. Fig. 4 is a crosswise sectional view of the roasting cylinder at line 4—4 in Fig. 2 showing the series of heating element trays and the slide plate for withdrawing the roast from the cylinder with one of the guides alongside the discharge opening for the coffee or other roasted article. Fig. 5 is a plan view of said slide showing the series of openings therein. Fig. 6 is a perspective view of one of the heating element trays with the cover removed, showing the zigzag heating wires and the preferred manner of mounting them therein as arranged for a one hundred ten volt circuit; and Fig. 7 is a perspective view of the empty tray; and Fig. 8 is a perspective view of the cover for said tray. Fig. 9 is a diagram of the manner of wiring the contact rings for the electrical connection to the heating element trays. Fig. 10 is a lengthwise sectional view of one of the heating element trays showing the preferred manner of arranging the same. Fig. 11 is a diagram of the wiring systems for the motors. Fig. 12 is a perspective view of a portion of the contact rings with the brushes bearing against the same and a diagram of the electrical connection to said brushes through the supporting frame. Fig. 13 is a detail elevation of the preferred manner of attaching the electrical conduit wire to the zigzag heating wires.

Like characters of reference refer to corresponding parts in the several views.

The numeral 15 designates the sheet metal casing which covers the entire roasting mechanism, confining the heat, smoke and dust therein, and having the doors 16 and 63 to admit to said mechanism.

A flue or vent 17 preferably extends centrally from the top of the casing 15, a second flue or vent 18 connecting the flue 17 to the feed pipe 19 which extends to the central portion of the roasting cylinder 20 to draw the moisture and dust therefrom through the flue 18, as well as to feed the coffee or other article to be roasted through said feed pipe 19 to the cylinder 20. A hopper 21 is provided on the top of the feed pipe 19 having a control or shut-off slide 22 in the feed pipe 19. The dampers 23 and 24 are provided in flues 17 and 18 for the control of said flues.

The cylinder 20 is rotatably mounted in the casing 15 upon a shaft 25 supported in suitable journals at each end on the frame 26, and has the driving worm 27 and gear 28 at one end, preferably the feeding end of the cylinder, mounted on said shaft 25 and a shaft 29, which shaft 29 is connected to a suitable source of power, preferably an electric motor 30, as shown in the diagram in Fig. 11.

The cylinder 20 is composed of a purality of supporting spiders 31, which are attached to the shaft 25 to rotate therewith. Each spider is composed of a hub 32, spokes 33 and rim 34 on which a cylindrical covering is removably attached preferably consisting of a series of detachable curved heating element trays 35, which extend entirely around said rim 34 with the exception of the discharge space 36, which is preferably the same width as the heating element trays 35, that is, the periphery of the rims 34 is divided into a series of equal spaces or segments, which is shown in the cross sectional view of the cylinder in Fig. 4 as having fourteen spaces and thirteen segmental heating element trays, the inner surfaces of which form the inner wall of the roasting cylinder.

Each of the heating element trays 35 is preferably composed of a tray or pan 37 as shown in Fig. 7, which tray or pan is shaped at the curve of the rims 34 so as to fit lengthwise thereon and are sufficiently deep to receive the heating elements therein. The heating elements comprise the insulation sheets 38, preferably mica, each side of the flat zigzag electrical heating wires 39; then a layer of asbestos board 40, a metal heat retaining plate 41 and the outer cover plate 42; which parts are, proportioned to just fill the tray or pan 37 and are securely held therein and removably attached to the rims 34 of the spiders 31 by bolts 43, which securely hold the segmental heating element trays 35 firmly against one another, thereby forming a complete roasting cylinder with the exception of the discharge opening or space 36.

The discharge space 36 is provided with a slide plate closure 44 which has the spaced openings 45 therethrough coinciding with the openings in said space 36 since the space 36 is divided into a series of discharge openings 45 by means of the inclined crosswise guide sections 46 which are shown in section in Fig. 2 and in lengthwise elevation in Fig. 4. These inclined guide sections 46 divide the coffee or other roasted article, guiding the same to the discharge openings 45 in combination with the cylindrical shape of the inner periphery of the cylinder 20.

The slide 44 is arranged in suitable guides so as to be moved endwise through the door 63 to close or open the openings 45, the spaced guides 46 being of sufficient width to provide complete closure for said openings when the slide plate 44 is moved endwise so as to place the openings 45 beneath said guides 46. This simple arrangement ensures the quick withdrawal of the entire roast since there is no point at which the coffee or cocoa beans or other roasting articles can lodge to thereby receive an overroast. The sectional shaped guides 46 are preferably arranged with a short spoke 47 which is attached to the sectional guide 46 at its outer end on that side of the cylinder 20.

Each of the spokes 33 and 47 of the spider 31 preferably has a baffle plate 48 attached thereon a spaced distance from the inner periphery of the heating element trays 35, and also a spaced distance from the hub 32 so that the coffee berries or other articles to be roasted will be evenly spread by said baffle plates 48 and at the same time withheld from collecting in a heap at one side, the baffle plates continually spreading the roast over the heated inner plates of the heating element trays 35, thereby producing an even roast and continually stirring the roasting particles, permitting the moisture and dust to be withdrawn from the same through the flue pipes 18 and 19.

The heat is preferably applied to the cylinder by means of a series of contact rings 49, 50 and 51 to which electrical contact is made by means of brushes 52, to which brushes electrical connection is preferably made with suitable switches 53 and thermostats 54 and 55. The contact rings 49, 50 and 51 are connected to the wires 39 in the heating element trays 35 as shown in diagram in Fig. 9 so that the outer ring 51 is preferably negative and the inner rings 49 and 50 are positive.

When the roast is withdrawn from the roasting cylinder 20 through the openings 45, it falls into the receiving hopper 56, the bottom of which inclines to one side to an opening 57 in the blast or blow pipe 58, which pipe 58 is connected to a motor driven fan 59 at one end, and extends from the other end to a receiving bin for the roast. A refuse collecting drawer 60 is provided opposite the opening 57 so that nails, stones and other articles of weight, as for example, unroasted coffee beans or cocoa beans, fall through the opening 61 into the drawer 62. The roasted coffee or cocoa beans being very light when at roasting heat, are carried by the blast from the fan 59 through the pipe 58 to the receiving bin.

The fan 59 preferably has a separate motor 64 as shown in the diagram in Fig. 11, for driving the same. An opening 65 is provided through the casing 15 and the end of the cylinder 20 around the shaft 25 to insert the trier 66 so that the roasting grains can be caught from the baffle boards 48 to test the roast without stopping the rotation of the cylinder 20. The slide 44 also may be withdrawn and the roast discharged from the cylinder without stopping the roasting cylinder 20. Said roasting cylinder is preferably given a rotation speed of about twenty-five to thirty rotations per minute, and it is accordingly obvious that a roast may be fed into the cylinder 20 and discharged therefrom while the roasting cylinder is rotatively in motion.

Suitable switches are provided on the casing 15 for the control of the motors and other electrically controlled apparatus so that in operating the roasting mechanism, it is apparent that the heat can be turned upon the heating elements 35. The cylinder 20 can then be started to rotate, after which, when the heat has reached the proper temperature, the roast may be lowered into the roasting cylinder 20 from the hopper 21 by the withdrawal of the slide 22. The roasting process is continued until the article is properly roasted, which, for example, in coffee, consumes from twenty-five to thirty minutes, since it is preferred to roast coffee under a comparatively low temperature or slow heat, after which the slide 44 is withdrawn through the door 63 sufficiently to provide the openings 45 through which the coffee or other roasting particles are discharged from the rotating cylinder into the hopper 56, which in turn discharges the same through the opening 57 into the blast pipe 58, thence to be carried by the air blast to the receiving bin.

The segmental heating element trays 35 preferably extend from end to end of the roasting cylinder 20, and are arcuate in crosswise section, preferably enlarging slightly outward, and the joints therebetween are radial, as shown in Fig. 4, so that when attached to the spiders 31 by means of the removable bolts 43, their lengthwise edges fit against one another. They are the same size and shape so as to be interchangeable. It is apparent that any one of said segment heating element trays 35 can be quickly and easily removed from the roasting cylinder for repair, or in case of serious impairment, a new segmental heating element tray 35 may be inserted, thereby delaying the use of the roasting cylinder for only a comparatively short time. This arrangement also permits the quick assemblage or disassemblage of the roasting cylinder, thereby not adding appreciably to the cost of the same.

The flat zigzag electrical heating wires 39 are preferably made from the so-called "nichrome" resistance wire, which wires 39 are separated from the conductor wires 67 on the connection or binding posts 68 by means of insulation, preferably copper, washers 69. This arrangement protects the "nichrome" wires, ensuring a positive contact for the same without danger of super-heating and burning off said "nichrome" wires near the contact point. At the same time said post forms a simple and easy manner of assemblage for said zigzag "nichrome" wires and contacts thereto within the heating element trays.

What is claimed as new is:

1. In an electric roaster, a stationary frame, a rotatable roasting cylinder including a supporting frame, a series of independent and separable heating elements arranged about the cylinder frame, means to individually connect each element to the cylinder frame, a series of circular contact means for the elements carried by the cylinder frame and having independent connection with each of the elements whereby to allow of removal of one or more of the elements without disturbing the connections between the contact means and the remaining elements, a series of brushes carried by the stationary frame and engaging the circular contact means, and a source of electrical supply connected to the contact means.

2. In an electric roaster, a rotatable roasting cylinder including a supporting frame, a series of independent and separable heating elements arranged about the frame, means to individually connect each element to the frame, a plurality of circular contact means for the elements carried by an end of the frame, means to independently connect each of the elements to the contact means whereby to allow of removal of one or more of the elements without disturbing the connections between the contact means and the remaining elements, and a source of electrical supply connected to the contact means.

3. In an electric roaster, a roasting cylinder including a supporting frame, a series of independent and separable heating elements arranged about the frame, means to individually connect each element to the frame, contact means for the elements carried by the frame and common to all of the heating elements and having independent connection with each of the elements whereby to allow of removal of one or more of the elements without disturbing the connections between the contact means and the remaining elements, and a source of electrical supply connected to the contact means.

4. In an electric roaster, a roasting cylinder including a frame, a sectional heating means arranged about the frame, means carried by the frame to supply electrical current to each section of the heating means, means to individually connect the sections to the current supplying means, means having wiping contact with the current supplying means to energize the latter, and means to secure the sections to the frame so as to allow of the removal of the sections.

5. In an electric roaster, a roasting cylinder having a frame, heating means arranged about the frame, the cylinder having an opening to admit and discharge the material to be roasted, a plurality of spaced members extending over the opening, and closure means for the opening having openings which in one position register with the spaces between the members and in a second position register with the members to close the spaces between the latter.

6. A roasting cylinder for coffee and similar articles comprising a spider, lengthwise arcuate segmental heating elements forming a covering around said spider to roast articles therein, said cylinder having a lengthwise opening in one side, a plurality of spaced guide divisions crosswise of said opening in said cylinder, a slide closure for said opening having openings therethrough substantially equal to the distance between said spaced segmental guide divisions to withdraw the roasted articles through said openings in said slide.

7. A roasting cylinder having electrical means for heating the interior of the same, a lengthwise slide in one side of said cylinder for drawing the roasted articles from said cylinder therethrough, a series of spaced crosswise guide divisions within said cylinder across said slide, said slide having a series of openings substantially equalling the spaced openings between said crosswise divisions in said cylinder to open and close said openings in said slide by moving said slide endwise beneath said divisions to close said openings or to withdraw said slide openings into the intervening spaces between said divisions to open the cylinder and withdraw the roast therethrough.

8. A roasting cylinder having electrical mechanism for heating the interior of the same to a roasting heat, said cylinder having an opening in one side for drawing the roasted articles therefrom, a lengthwise closure slide for said opening, a receiving hopper beneath said cylinder, a blast pipe having an opening thereinto from said receiving hopper for the roasted articles to gravitate therethrough, and a fan on said blast pipe to cool and blow the roasted articles to a receiving bin.

9. A roasting cylinder having electrical mechanism for heating the interior of the same to a roasting heat, said cylinder having an opening in one side for drawing the roasted articles therefrom, a lengthwise closure slide for said opening, a receiving hopper beneath said cylinder, a blast pipe having an opening thereinto from said receiving hopper for the roasted articles to pass through, a fan on said blast pipe to cool and blow the roasted articles to a receiving bin, and a stoner drawer having an opening thereinto from the blast pipe beneath and adjacent to the opening from said receiving hopper to receive the stones and other heavy articles from the roast.

10. A roasting cylinder having electrical means for heating the interior thereof to a roasting heat, a lengthwise slide-closed opening in the side of said cylinder for drawing the roasted articles therefrom, a receiving hopper beneath said roasting cylinder for the roasted article, a sheet metal casing covering said cylinder and hopper, a flue or vent in the top of said casing having damper control therefor, a feed pipe extending to said roasting cylinder to feed the articles to be roasted thereinto, a crosswise flue between said feed pipe and said flue to draw the moisture and dust from said roasting cylinder while the articles are roasting, and damper control for said crosswise flue.

11. In an electric roaster, a roasting cylinder having a discharge opening, means to heat the cylinder, a hopper to receive material discharged through said opening, means to open and close the opening, a blast pipe communicating with the hopper to receive the material from the latter, and means to create a blast in the pipe to cool and carry the roasted material to a point of storage.

12. In an electric roaster, a casing, a roasting cylinder therein having an inlet, electrical means to heat the cylinder, a flue in the top of the casing, a feed pipe carried by the casing to feed the material to be roasted to the cylinder, and a flue between the feed pipe and the first named flue to carry off the moisture and dust from the cylinder during roasting of the material.

In testimony whereof I have affixed my signature in the presence of two witnesses.

MARK T. SEYMOUR.

Witnesses:
CORINNE V. SWANSON,
THEO. THOMAS HAAG.